Feb. 25, 1936.                    W. G. LAIRD                    2,032,325
                              PRESSURE RELIEF VALVE
                           Original Filed June 15, 1931

INVENTOR
WILBUR G. LAIRD
BY Edmund G. Borden
ATTORNEY

Patented Feb. 25, 1936

2,032,325

UNITED STATES PATENT OFFICE 2,032,325

PRESSURE RELIEF VALVE

Wilbur G. Laird, Pleasantville, N. Y., assignor to Doherty Research Company, New York, N. Y., a corporation of Delaware Original application June 15, 1931, Serial No. 544,484. Divided and this application January 12, 1935, Serial No. 1,545

4 Claims. (Cl. 277—13)

This invention relates to fluid pressure relief valves, and more particularly to an improved form of safety valve adapted for use on gasoline and other volatile and inflammable liquid storage tanks or systems which are normally sealed against vapor loss and in which sudden pressure changes may occur which would be extremely hazardous if suitable pressure and vacuum relief mechanism were not included in the installation. The invention was originally described in my copending application Serial No. 544,484, filed June 15, 1931, of which this application is a division.

The storage of liquids of a readily volatile nature, and particularly the storage of liquid petroleum, presents a number of difficulties. When direct solar heat raises the temperature of liquid petroleum and the contents of the vapor space within a sealed storage tank, the pressure within the tank may rise rapidly due to the evolution of dissolved gases and evaporation of the volatile fractions of the oil and the expansion of the gaseous contents of the vapor space above the liquid. The pressure within an oil storage tank, thus exposed to solar evaporation and expansion, if not immediately corrected, as by releasing vapors to the atmosphere, may attain such proportions that the tank may burst. Moreover under conditions where the temperature of the surrounding atmosphere drops rapidly, the pressure within a sealed storage tank may drop below atmospheric due to the condensation and contraction of vapors and gases. In such a case the pressure within the tank may drop to the point where the walls or the roof thereof will collapse.

It has been proposed to overcome these difficulties and at the same time prevent vapor loss and reduce danger from fires as a result of admission of air into the tank, by connecting the vapor space of a sealed oil storage tank in closed circuit with a variable volume gasholder, so that the pressure within the tank may be controlled by free breathing or vapor flow between the tank and the gasholder. However it is often impracticable to provide pipes connecting the storage tank and gasholder of sufficient capacity to allow the rapid breathing which would sometimes be required to prevent development of abnormal pressures within the tank as a result of excessive rate of pumping of liquid into or from the tank or of periods of very rapid evaporation or condensation occasioned by sudden and marked changes in weather temperatures—as for example by a thunderstorm in hot summer weather.

The common type of oil storage tank in use today is constructed with a conical roof of light metal which will withstand only very low pressure differentials between the surrounding atmosphere and the inside of the tank. This type of tank roof may not always have sufficient inherent strength to withstand the pressure, amounting to several inches of water, which is imposed by a gasholder lift on a closed vapor storage system such as described in my U. S. Patent 1,794,383.

A primary object of the present invention is to provide an improved type of safety valve adaptable to a closed liquid storage system to correct any abnormal pressures developed within the system.

Other objects and advantages of the invention will be apparent from the following detailed description, taken with the accompanying drawing, in which.

Figure 2:
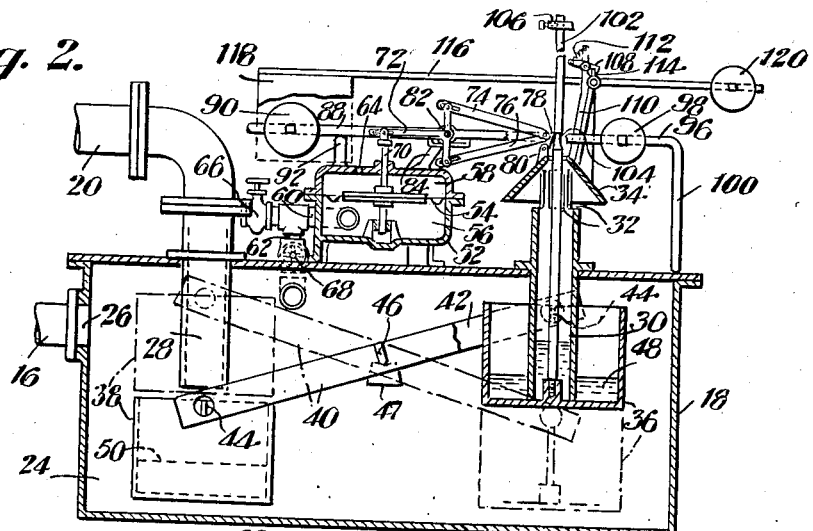
Fig. 2 is a vertical sectional view of the preferred safety valve element of the improved oil storage system, parts being in elevation.

Referring to the drawing (Fig. 1), the liquid to be stored is placed in a storage tank 10 having cylindrical walls 12 and a conical roof 14 tightly sealed against the escape of gases and vapors. The roof may be permanently reinforced so as to withstand pressure differentials up to several ounces between the interior of a large tank and the outside atmosphere.

Figure 1:
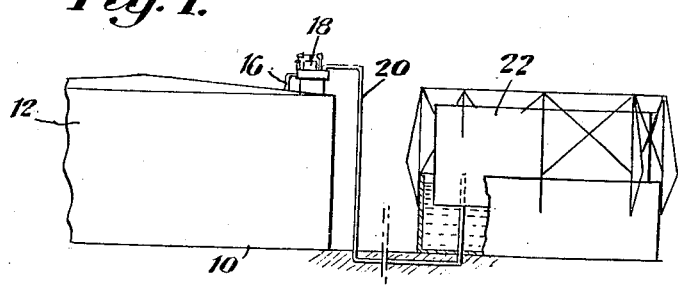
Fig. 1 is a view in diagrammatic vertical section of a liquid storage system embodying the improvements forming the subject of the present invention.

The vapor space of the storage tank 10, reinforced as above described, is connected by means of a vapor conduit 16 to a safety valve 18 suitably mounted upon the roof of the tank 10 by means of leveling brackets, and thence by means of a vapor conduit 20 to the bell of a variable volume gasholder 22 (Fig. 1). While but one oil storage tank is shown as being connected to the bell of the gasholder 22, it is obvious that a series of interconnected oil storage tanks may be connected to the gasholder 22 in a system such as described in my Patent No. 1,794,383.

Figure 3:
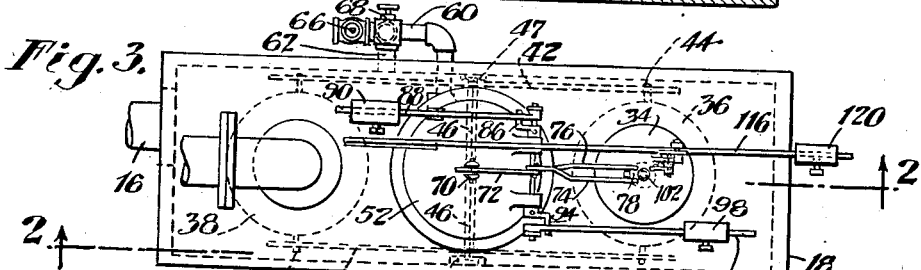
Fig. 3 is a top plan view of the safety valve shown in Fig. 2.
Figure 4:
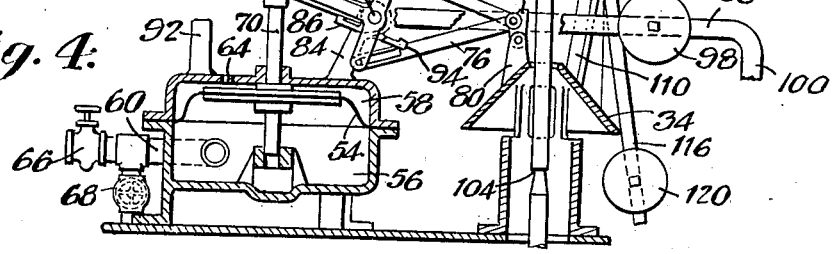
Fig. 4 is an enlarged vertical sectional view of a portion of the valve actuating mechanism shown in Fig. 2, illustrating the operation of the mechanism due to excessive pressure within the system.

The safety valve 18, the application of which according to the oil storage system of the present invention is shown in Fig. 1, is more completely illustrated in Figs. 2, 3, and 4 of the drawing.

The valve 18 comprises a gas chamber 24 having a vapor inlet 26 from pipe 16, a vapor outlet pipe 28 formed as an extension of the vapor conduit 20, and a normally closed outlet pipe 30 leading to the atmosphere through openings 32 which are situated beneath, and protected by, a frusto-conical cover 34. Within the chamber 24 is a pair of buckets 36 and 38, each having knife edge trunnions 44 on opposite sides of its rim with which the ends of beams 40 and 42 pivotally engage. The beams 40 and 42 are pivotally mounted at their midpoints upon a shaft 46 which is in turn pivotally supported by brackets 47 affixed to opposite walls of chamber 24. The buckets 36 and 38 are mounted in unbalanced weight relationship to each other. The beam end having the bucket 36 and its restraining rod is the heavier and is normally held in an elevated position in sealing relationship with the outlet pipe 30. The bucket 38 is shown in its normally depressed position, allowing free flow of vapor through the outlet pipe 28 (Fig. 3). When the bucket 36 is lowered, there is open communication between chamber 24 and the atmosphere through the pipe 30. Bodies of liquid 48 and 50, which may be water in the summer and oil in the winter, are maintained in the buckets 36 and 38, respectively, so as to act as sealing liquid when the buckets 36 and 38 are in sealing engagement with the respective pipes 30 and 28.

Above the chamber 24 is located a diaphragm chamber 52 which contains a common form of movable diaphragm 54 dividing the chamber 52 into two compartments 56 and 58. The compartment 56 communicates with the chamber 24 through a conduit 60 and 62, and the compartment 58 communicates with the atmosphere through port 64. A branch is provided from the conduit 60 and is valved at 66 to permit attaching a gauge to determine the pressure within the system. A valve is provided at 68 in conduit 62 for the purpose of closing off communication between chambers 24 and 52, should discontinuance of the operation of the safety valve be desired.

The diaphragm 54 operates the rod 70, which moves upwardly or downwardly as the pressure within the tank 10 and chamber 24 changes. The rod 70 is slidably attached to the double bell-crank 72, the T-ends of which are in turn slidably attached to the slotted ends of bars 74 and 76. The bars 74 and 76 are pivotally secured by pins to a latch 78 which is in turn pivotally connected to a bracket 80 extending upwardly from the cover 34. The double bell-crank 72 is fulcrumed by, and attached to a shaft 82 which is journaled in brackets 84 extending upwardly from the diaphragm chamber 52.

On the shaft 82 a member 86 is mounted so as to actuate with the shaft 82 in response to movements of the diaphragm 54. Upon upward diaphragm movement the member 86 comes into contact with and raises the lever arm 88, which is loosely pivoted upon the shaft 82. A counterweight 90 is adjustably mounted on the free end of lever arm 88 to counteract the pressure under the diaphragm 54 until a predetermined pressure is reached. The lever arm 88, under normal pressure conditions within the system, rests upon a rest bracket 92.

Similarly on another part of the shaft 82 is mounted a member 94 which actuates with the shaft 82 in response to movements of the diaphragm 54 caused by pressure changes within the system. With downward diaphragm movement, the member 94 comes into contact with and raises the lever arm 96. Lever arm 96 is loosely pivoted upon the shaft 82, and a counterweight 98 is adjustably mounted thereon, to counteract the pressure above the diaphragm 54 until a predetermined pressure is reached. The lever arm 96 may be bent at the outer or free end thereof to form a vertical extension 100 adapted to rest upon the casing of the chamber 24 under normal conditions.

Attached to the bucket 36 and extending vertically upward through the top of the frusto-conical cover 34 is a rod 102 notched at 104 and carrying at its upper end a collar 106 (Fig. 3). The latch 78 normally engages the notch 104 and maintains the rod 102 in a raised position. In this position the bucket 36 containing the body of sealing liquid 48, seals off communication between valve chamber 24 and the outer atmosphere thru pipe 30.

The valve mechanism thus described is intended merely as a safety valve, and hence under normal conditions will remain in the position illustrated in Fig. 3. However under rapid temperature changes, or for other cause, the pressure within the system may occasionally vary beyond the pressure limits for which the valve is set. When the pressure within the tank 10 increases, the pressure within the chamber 24 and in the communicating compartment 56 of the diaphragm chamber 52 will increase accordingly and tend to lift the weighted diaphragm 54. The counterweight 90 is adjustable on the lever 88 to restrain the upward movement of diaphragm 54 until a predetermined limiting pressure has been reached. When this limiting pressure is reached, the diaphragm 54 will rise and lift the arm 72 of the double bell crank which is attached to the shaft 82, and, by means of member 86, will lift the lever arm 88 and the counterweight 90. In this movement the arms 74 and 76 of the double bell crank will be actuated as shown in Fig. 4, and the latch 78 will be disengaged by means of bar 76 from the notch 104 in the rod 102, allowing the heavier bucket 36 with its retaining rod 102 to fall. As bucket 36 falls, beams 40 and 42 swing on the bearings 47 and bring the bucket 38 into sealing relationship with the pipe 28, thus sealing off this outlet pipe and simultaneously opening the chamber 24 to the outside atmosphere through the pipe 30 and the openings 32.

Similarly, when the pressure within the system decreases, the pressure within the chamber 24 and the compartment 56 of the diaphragm chamber will decrease accordingly and the diaphragm 54 will tend to fall. The counterweight 98 is adjustable on the lever arm 96 to restrain the downward movement of diaphragm 54 until predetermined limiting negative pressure or partial vacuum is reached in the system and beneath the diaphragm 54. When the predetermined limit of partial vacuum is reached, the diaphragm 54 will fall, lowering the arm 72 of the double bell crank and thereby causing the member 94 to lift the lever arm 96 and counterweight 98. In this movement the upper arm of the double bell crank will disengage the latch 78 from the notch 104 by means of bar 74, allowing the bucket 36 to fall and effect simultaneous sealing of the pipe 28 and the opening of chamber 24 to the outside atmosphere.

When the pressure within the system varies beyond the minimum or maximum limits for which the counterweights are set, the valve mechanism operates to trip the rod 102 and in so doing brings the collar 106 into contact with a latch 108 (Fig. 4), which is pivotally mounted on a bracket 110 extending upwardly from the cover 34. The latch 108 is normally held in an approximately horizontal position (Fig. 2) by spring 112 extending from the bracket 110 to the latch. Normally latch 108 engages the pin 114 attached to the shaft of the counterweighted flag arm 116 which is held in an approximately horizontal position. At one end of the flag arm 116 is a flag or other symbol 118 overbalanced at the other end by a weight 120. When the collar 106 trips the latch 108, the signal arm 116 is released and swings to a vertical position so that the flag may notify the operator that the pressure on the system has exceeded the set limits, and has tripped the safety valve, cut the tank off of the system, and vented it to the atmosphere.

The safety valve is designed for manual resetting, and may be manually tripped when it is desired to disconnect an oil storage tank from the system.

The invention having been thus described, what is claimed as new is:

1. A valve structure comprising a gas chamber, an inlet to said chamber, a normally closed outlet from said chamber and a normally open outlet therefrom, two upright bucket containers for sealing liquid, each adapted to serve as a sealing valve for one of said outlets, a diaphragm movable in response to pressure variations within said gas chamber, and means responsive to a movement of said diaphragm operatively connected to said buckets for simultaneously sealing the normally open outlet and opening said normally closed outlet.

2. In a safety valve, a gas chamber, an inlet conduit ported out in said chamber, two outlet conduits leading off from said chamber, two upright bucket containers for sealing liquid each adapted to serve as a sealing valve for one of said outlets, mechanism adapted to maintain said buckets in connected unbalanced weight relation with the heavier bucket in normal sealing relationship with one outlet and the other bucket in normal non-sealing relationship with the other outlet and a device operative in response to variations in pressure in said chamber beyond a predetermined maximum and minimum range for reversing the relative positions of said buckets to open the normally sealed outlet and to seal the normally open outlet.

3. In a safety valve, a liquid filled upright bucket normally forming a sealing closure for the base of an upright conduit open to atmosphere at its top and sealed off from a variable gas pressure on its lower end by said bucket, a similar liquid filled bucket adapted to be brought into sealing relationship with the lower end of a normally open gas conduit, actuating means tending normally to maintain said buckets in the relative positions specified, and means connecting said buckets and operable by said actuating means to cause the same to operate in unison to break the seal of said normally closed conduit and to seal the said normally open conduit.

4. In a safety valve, a chamber, an inlet conduit ported out in said chamber, two outlet conduits extending vertically into said chamber at spaced points, two upright bucket containers for sealing liquid each adapted to serve as a sealing valve for one of said outlets, mechanism including a balance beam connecting the buckets and a latch adapted to maintain one of said buckets in normally elevated sealing relation with one outlet and the other bucket in normally depressed non-sealing relation with the other outlet, and means responsive to abnormal pressure in said chamber for releasing said latch and thereby actuating said bucket valves to open the normally closed outlet and close the normally open outlet.

WILBUR G. LAIRD.